(12) United States Patent
Watson et al.

(10) Patent No.: US 6,861,261 B2
(45) Date of Patent: Mar. 1, 2005

(54) TEMPERATURE INDICATING PAINT

(75) Inventors: Hugh M L Watson, Derby (GB); Elaine C Hodgkinson, Derby (GB)

(73) Assignee: Rolls-Royce plc, London (GB)

( * ) Notice: Subject to any disclaimer, the term of this patent is extended or adjusted under 35 U.S.C. 154(b) by 339 days.

(21) Appl. No.: 10/229,137

(22) Filed: Aug. 28, 2002

(65) Prior Publication Data
US 2003/0049467 A1 Mar. 13, 2003

(30) Foreign Application Priority Data
Sep. 7, 2001 (GB) .............................................. 0121640

(51) Int. Cl.[7] .......................... G01N 21/78; C01D 5/26
(52) U.S. Cl. ............................. 436/84; 436/73; 436/72; 436/164; 422/82.12; 106/400; 106/403; 106/404; 106/480
(58) Field of Search .......................... 436/73, 84, 164; 422/82.12; 109/400, 403, 404, 480

(56) References Cited

U.S. PATENT DOCUMENTS 4,613,560 A * 9/1986 Dueber et al. ........... 430/286.1
6,436,543 B1 * 8/2002 Endo et al. ................. 428/447

FOREIGN PATENT DOCUMENTS

| GB | 1103059 P | 2/1968 |
|----|-----------|--------|
| GB | 2204874 A | 11/1988 |

* cited by examiner

Primary Examiner—Jill Warden
Assistant Examiner—LaToya Cross
(74) Attorney, Agent, or Firm—W. Warren Taltavull; Manelli Denison & Selter PLLC

(57) ABSTRACT

An irreversible temperature indicating paint comprises 29 wt % to 37 wt % cobalt aluminium spinel and glass, 35 wt % to 45 wt % acrylic resin and 20 wt % to 30 wt % silicone resin excluding solvent. The solvent comprises a mixture of 80% 1-methoxy-2-propanol and 20% dipropylene glycol monomethyl ether. A particular irreversible temperature indicating paint comprises 34.9 wt % cobalt aluminium spinel and glass, 42.5 wt % acrylic resin and 22.6 wt % silicone resin excluding solvent. The irreversible temperature indicating paint has four or more colour changes in the temperature range 500° C. to 900° C. The irreversible temperature indicating paint is used to determine the temperatures to which various parts of turbine blades, turbine vanes or other components are subjected in operation of the gas turbine engine.

6 Claims, No Drawings

TEMPERATURE INDICATING PAINT

The present invention relates to an irreversible temperature indicating paint.

Irreversible temperature indicating paint changes colour at one or more known temperatures. These colour changes of the temperature indicating paint indicate the temperature to which different parts of a component or components have been subjected. The final colour of the irreversible temperature indicating paint is dependent on both the temperature it is subjected to and the time period over which it is held at a raised temperature. The irreversible temperature indicating paint is applied to a component in a test situation and subsequently analysed to determine the temperatures to which different regions of the component reached during the test. Irreversible temperature indicating paints thus produce a temperature profile over the whole surface of a component rather than discrete points, if for example thermocouples are used.

Irreversible temperature indicating paints are applied to components, for example turbine blades, turbine vanes and combustors, of gas turbine engines and the gas turbine engine is run at the gas turbine engines normal operating conditions.

One known temperature indicating paint described in our UK patent GB1103059 comprises principally lead chromate, magnesium carbonate and silica.

Another known temperature indicating paint described in our UK patent GB2204874 comprises one or more of silver, gold, platinum, palladium, copper, nickel, chromium, titanium and silicon dispersed in 10 to 70 wt % solvent and resin.

Currently used temperature indicating paint used in the temperature range 500° C. to 900° C. does not provide sufficient resolution of the temperature.

Accordingly the present invention seeks to provide a novel irreversible temperature indicating paint which has a plurality of colour changes in the temperature range 500° C. to 900° C. to provide improved temperature resolution.

Accordingly the present invention provides an irreversible temperature indicating paint comprising cobalt aluminium spinel, glass, a binder and a solvent.

Preferably the binder comprises acrylic resin and silicone resin.

Preferably the irreversible temperature indicating paint comprises 29 wt % to 37 wt % cobalt aluminium spinel and glass, 35 wt % to 45 wt % acrylic resin and 20 to 30 wt % silicone resin excluding solvent.

Preferably the irreversible temperature indicating paint comprises 33 wt % to 37 wt % cobalt aluminium spinel and glass, 37.5 wt % to 45 wt % acrylic resin and 21 to 27.5 wt % silicone resin excluding solvent.

Preferably the irreversible temperature indicating paint comprises 34 wt % to 36 wt % cobalt aluminium spinel and glass, 40 wt % to 45 wt % acrylic resin and 22 to 25 wt % silicone resin excluding solvent.

Preferably the irreversible temperature indicating paint comprises 34.9 wt % cobalt aluminium spinel, 42.5 wt % acrylic resin and 22.6 wt % silicone resin excluding solvent.

Preferably the solvent comprises a mixture of propylene glycol ethers. Preferably the solvent comprises a mixture of 80% 1-methoxy-2-propanol and 20% dipropylene glycol monomethyl ether.

The present invention will be more fully described by way of example.

An irreversible temperature indicating paint according to the present invention has four or more colour changes in the temperature range 500° C. to 900° C. when run at maximum operating conditions of a gas turbine engine, or other engine, for 3 minutes.

The irreversible temperature indicating paint comprises cobalt aluminium spinel, glass, a binder and a solvent.

The irreversible temperature indicating paint broadly comprises 29 wt % to 37 wt % cobalt aluminium spinel and glass, 35 wt % to 45 wt % acrylic resin and 20 wt % to 30 wt % silicone resin excluding solvent. The solvent comprises a mixture of propylene glycol ethers, for example the solvent comprises a mixture of 80% 1-methoxy-2-propanol and 20% dipropylene glycol monomethyl ether. The amount of solvent used is varied depending upon the particular method of applying the irreversible temperature indicating paint.

The irreversible temperature indicating paint more narrowly comprises 33 wt % to 37 wt % cobalt aluminium spinel and glass, 37.5 wt % to 45 wt % acrylic resin and 21 wt % to 27.5 wt % silicone resin excluding solvent.

Preferably the irreversible temperature indicating paint comprises 34 wt % to 36 wt % cobalt aluminium spinel and glass, 40 wt % to 45 wt % acrylic resin and 22 wt % to 25 wt % silicone resin excluding solvent.

A particular irreversible temperature indicating paint comprises 34.9 wt % cobalt aluminium spinel ($CoAl_2O_4$) and glass, 42.5 wt % acrylic resin and 22.6 wt % silicone resin excluding solvent. The cobalt aluminium spinel and glass is sold under the trade name 121603 Decorating Colour Blue by Degussa Metals Catalysts Cerdec AG of Geschaftsbereich Cerdec, P.O. Box 110403, D-60039 Frankfurt, Germany. The cobalt aluminium spinel may comprises two or more cobalt aluminium spinels comprising cobalt and aluminium which have a blue colour or blue green colour. Cobalt aluminium spinel comprises cobalt aluminate or cobalt aluminium oxide.

Decorating Colour Blue 121603 comprises glass and oxides having a CAS-No 65997-17-3, a cobalt aluminium spinel having a CAS-No 1345-16-0 and a cobalt aluminium spinel having a CAS-No 68187-11-1.

The irreversible temperature indicating paint has four or more colour change points in the temperature range 500° C. to 900° C. The irreversible temperature indicating paint has improved temperature resolution in the temperature range 500° C. to 900° C., particularly in the temperature range 600° C. to 800° C.

The irreversible temperature indicating paint is applied to turbine blades or turbine vanes or other components of gas turbine engines. The irreversible temperature indicating paint is used to determine the temperatures to which various parts of the turbine blade, turbine vane or other component are subjected in operation of the gas turbine engine.

The irreversible temperature indicating paint may be used on components in other engines or other machines or other apparatus to determine the temperature to which various parts of the component are subjected in operation.

We claim:

1. An irreversible temperature indicating paint comprising cobalt aluminium spinel, glass, a binder and a solvent the binder comprising acrylic resin and silicone resin, wherein the irreversible temperature indicating paint comprises 29 wt % to 37 wt % cobalt aluminum spinel and glass, 35 wt % to 45 wt % acrylic resin and 20 wt % to 30 wt % silicone resin excluding solvent.

2. An irreversible temperature indicating paint as claimed in claim 1 comprising 33 wt % to 37 wt % cobalt aluminium spinel and glass, 37.5 wt % to 45 wt % acrylic resin and 21 wt % to 27.5 wt % silicone resin excluding solvent.

3. An irreversible temperature indicating paint as claimed in claim 2 comprising 34 wt % to 36 wt % cobalt aluminium and glass, 40 wt % to 45 wt % acrylic resin and 22 wt % to 25 wt % silicone resin excluding solvent.

4. An irreversible temperature indicating paint as claimed in claim 3 comprising 34.9 wt % cobalt aluminium spinel and glass, 42.5 wt % acrylic resin and 22.6 wt % silicone resin excluding solvent.

5. An irreversible temperature indicating paint as claimed in claim 1 wherein the solvent comprises a mixture of propylene glycol ethers.

6. An irreversible temperature indicating paint as claimed in claim 5 wherein the solvent comprises a mixture of 80% 1-methoxy-2-propanol and 20% dipropylene glycol monomethyl ether.

* * * * *